US008166200B2

(12) United States Patent
Lev

(10) Patent No.: US 8,166,200 B2
(45) Date of Patent: Apr. 24, 2012

(54) SMART ROUTING

(75) Inventor: Boaz Lev, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 221 days.

(21) Appl. No.: 12/413,607

(22) Filed: Mar. 30, 2009

(65) Prior Publication Data

US 2010/0250776 A1     Sep. 30, 2010

(51) Int. Cl.
*G06F 15/173*     (2006.01)
(52) U.S. Cl. .................................... 709/238; 709/225
(58) Field of Classification Search ................... 709/238
See application file for complete search history.

(56) References Cited

U.S. PATENT DOCUMENTS

| | | | |
|---|---|---|---|
| 6,424,992 B2 | 7/2002 | Devarakonda et al. | |
| 6,968,389 B1 | 11/2005 | Menditto et al. | |
| 7,136,927 B2 * | 11/2006 | Traversat et al. | 709/230 |
| 7,401,160 B2 | 7/2008 | Johnson et al. | |
| 7,480,737 B2 * | 1/2009 | Chauffour et al. | 709/245 |
| 7,490,164 B2 | 2/2009 | Srivastava | |
| 2003/0014469 A1 | 1/2003 | Ramaswamy | |
| 2003/0033428 A1 * | 2/2003 | Yadav | 709/238 |
| 2003/0069968 A1 | 4/2003 | O'Neil et al. | |
| 2003/0074393 A1 | 4/2003 | Peart | |
| 2004/0111523 A1 * | 6/2004 | Hall et al. | 709/230 |
| 2006/0174016 A1 * | 8/2006 | Critchley et al. | 709/228 |
| 2006/0271705 A1 * | 11/2006 | Garcia-Luna-Aceves | 709/242 |
| 2009/0027495 A1 | 1/2009 | Oskin et al. | |
| 2009/0217080 A1 * | 8/2009 | Ferguson et al. | 714/4 |

FOREIGN PATENT DOCUMENTS

JP     2003122732 A   *   4/2003

OTHER PUBLICATIONS

NNRD455143. "Use of Virtual Local Area Networks in a Shared Infrastructure to Support Multiple Customers at Low Cost." IBM Technical Disclosure Bulletin. Mar. 2002, UK. Issue 455, p. 504. 5 Pages.*
"Introduction", retrieved at << http://www.novell.com/documentation/extend52/Docs/help/MP/jms/admin/routing.html>>, pp. 1-3.
"Configuring DHCP Local Server", retrieved at << http://www.juniper.net/techpubs/software/erx/junose60/swconfig-broadband/html/dhcp-server-config8.html>>, pp. 1-15.
"Palat, Vijaykumar","Setting up Collocated WebSphere Application Server Load Balancers and Content Hosts", retrieved at <<http://www.ibm.com/developerworks/websphere/library/techarticles/0406_palat/0406_palat.html>>, Jun. 9, 2004. pp. 1-4.

(Continued)

*Primary Examiner* — Jeffrey R Swearingen
(74) *Attorney, Agent, or Firm* — Hope Baldauff Hartman, LLC

(57) ABSTRACT

A router module receives a client request. In response to receiving the request, the router module obtains the network address of a server module to fulfill the request. The router module then determines whether it is executing on the same physical computer as the server module. If the router module determines that the server module is not executing on the same physical computer, the router module forwards the client request to the server module utilizing a standard network transport. If the router module determines that the server module is executing on the same computer, the router module forwards the client request to the server module using an optimized transport, such as an optimized local-machine-only transport.

12 Claims, 4 Drawing Sheets

OTHER PUBLICATIONS

"Wueng, et al","Design of a Code Generator for ActiveRMI", retrieved at <<ftp://syslab.cse.yzu.edu.tw/pub/doc/papers/2004/anw2004.pdf>>, pp. 1-5.

"International Search Report", Mailed Date: Oct. 19, 2010, Application No. PCT/US2010/028935, Filed Date: Mar. 26, 2010, pp. 9.

"Introduction", JMS Routing, downloaded Mar. 10, 2009 from http://www.novell.com/documentation/extend52/0ocs/help/MP/jms/admin/routing.html, 3 pages.

"Configuring DHCP Local Server", downloaded Mar. 10, 2009 from http://www.juniper.neUtechpubs/software/erxljunose60/swconfig-broadband/html/dhcp-server-config8.htm, 15 pages.

Wueng et al, "Design of a Code Generator for ActiveRMI", 2004, *Proc. of 2004 Active Networking Workshop*, downloaded Mar. 10, 2009 from ftp://syslab.cse.yzu.edu.tw/pub/doc/papers/2004/anw2004.pdf, 5 pages.

* cited by examiner

SMART ROUTING

BACKGROUND

In many types of client-server architectures, a form of routing is performed on a request made by a client until it reaches the server that fulfills the request. This type of routing can happen for many reasons, such as load balancing among a group of server computers, providing a higher quality of service to certain categories of clients, and others.

In some cases the server that performs the routing and the server that fulfills the client request are the same physical server. In these cases, the server typically routes the client request over the network and back to the same physical server for processing. This type of routing can be inefficient.

It is with respect to these and other considerations that the disclosure made herein is presented.

SUMMARY

Technologies are described herein for smart routing. In particular, through an implementation of the concepts and technologies presented herein, if the fulfilling server and the router are on the same physical computing system, an optimized transport is utilized to carry the client request from the router to the server and to carry back a response. For instance, the optimized transport might be a local-machine-only transport that does not require the client request to be routed over a network. Rather, the local-machine-only transport provides an optimized mechanism for routing the client request without using a network stack.

According to one embodiment, a router module receives a client request. In response to receiving such a request, the router module obtains a network address of a server module to fulfill the request. For instance, the router module may query a load balancer to obtain the network address of the server module. The router module then determines, based upon the network address of the server module, whether it is executing on the same physical computer as the server module. In one implementation, the router module compares the network address of the server module to a list of network addresses that the server on which the router module is executing responds to in order to make this determination.

If the router module determines that the server module is not executing on the same physical computer, the router module forwards the client request to the server module utilizing a standard network transport, such as the transmission control protocol/Internet protocol ("TCP/IP"), hyper-text transport protocol ("HTTP"), or another type of transport. If the router module determines that the server module is executing on the same computer, the router module forwards the client request to the server module using an optimized transport. For instance, in one particular implementation, the optimized transport may comprise a transport that utilizes binary encoding, such as a TCP transport. According to another implementation, the optimized transport comprises an optimized local-machine-only transport, such as a named pipe binding, for enabling communication between the router module and the server module without the use of a network stack. The optimized transport is also utilized to transmit the response from the server module to the server module.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
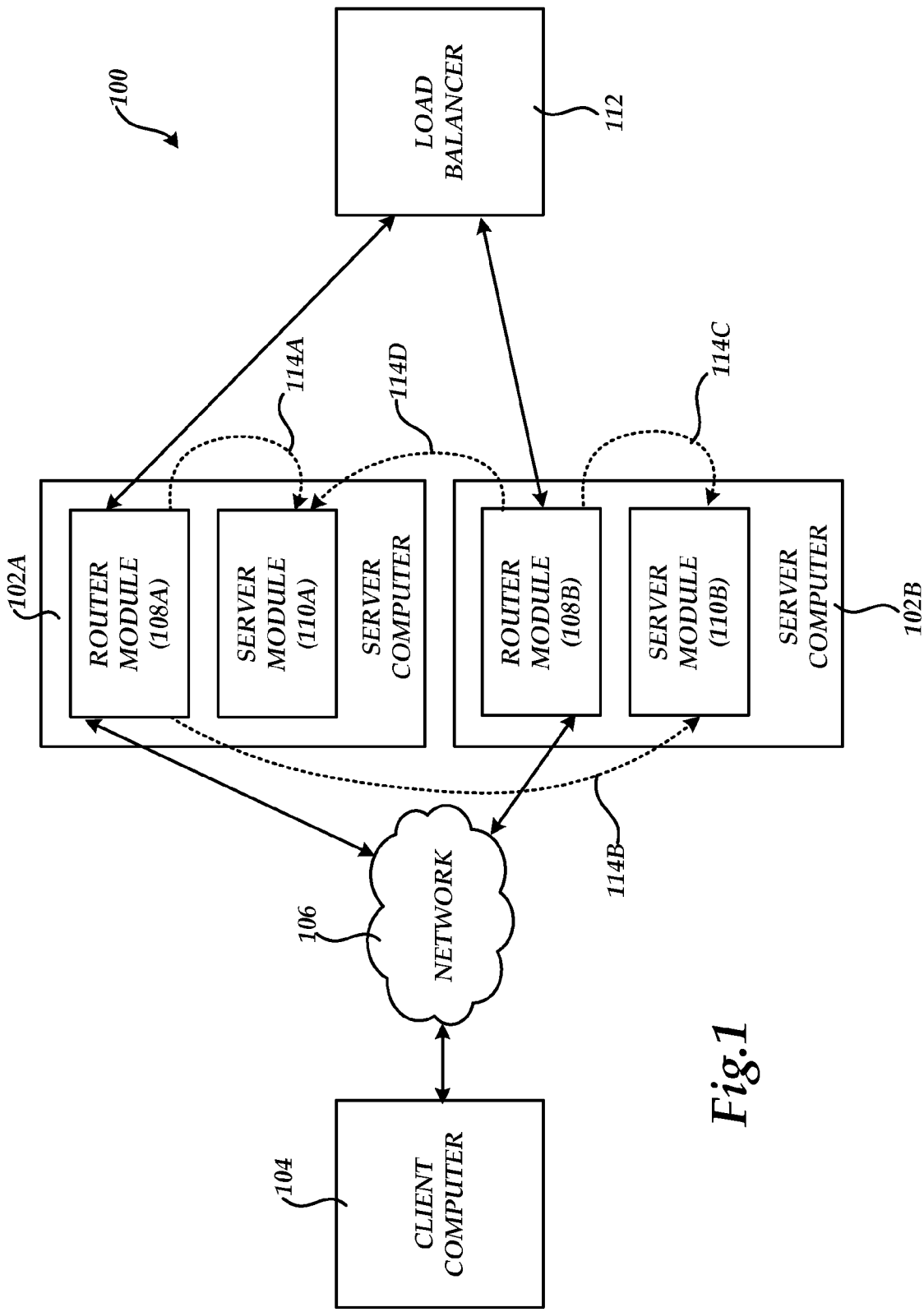
FIG. 1 is a network diagram showing one illustrative operating environment for the embodiments presented herein.

The following detailed description is directed to technologies for optimized routing. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements throughout the several figures, aspects of a computing system and methodology for optimized routing will be presented.

Turning now to FIG. 1, details will be provided regarding an illustrative operating environment for the embodiments presented herein. In particular, FIG. 1 shows aspects of a system 100 that forms an illustrative operating environment for the embodiments presented herein. As shown in FIG. 1, a client computer 104 connects to one or more server computers 102A-102B via a network 106. It should be appreciated that the networks discussed herein, such as the network 106, are merely illustrative and that more or fewer networks may be utilized in the actual implementations of the technologies presented herein. Moreover, it also should be appreciated that while a single network 106 has been illustrated in FIG. 1, more networks than illustrated may be utilized in various embodiments presented herein. Moreover, it should be appreciated that the network 106 may span the Internet, for example. For instance, the client computer 104 may be located on one continent while the servers 102A-102B are located on another.

It should further be appreciated that the client computer 104 may comprise any type of computing system capable of generating a request to a server computer. For instance, the client computer 104 may comprise a standard desktop or laptop computer system, a server computer, a handheld computing system, a set top box, or a wireless mobile telephone with data capabilities.

As shown in FIG. 1, each of the server computers 102A-102B may be equipped with a router module 108A-108B, respectively, and a server module 110A-110B, respectively. The router modules 108A-108B comprise software programs that receive requests from the client computer 104. The router modules 108A-108B also provide functionality for routing requests received from the client computer 104 to an appropriate server module 110A-110B for processing. Responses from the respective server modules 110A-110B are returned to the router module 108A-108B that forwarded the original request to the server module. The router module then forwards the response to the client computer 104. It should be appreciated that the server module 110A-110B comprises a software component configured to receive and respond to requests. For instance, the server modules 110A-110B may comprise Web server programs, Web services, and other types of server components.

In order to determine which of the server modules 110A-110B a client request received from the client computer 104 is to be routed to, the router modules 108A-108B are configured to utilize the services of a load balancer 112. The load balancer is a software or hardware component configured to identify one of the server modules 110A-110B for fulfilling a request from a client computer 104. It should be appreciated that the load balancer 112 may utilize various algorithms to identify the appropriate server module 110A-110B, including but not limited to, the current processing load of the server computers 102A-102B, providing a higher quality of service to certain categories of client computers 104, and other factors. It should be appreciated that the embodiments presented herein are not dependent upon any particular mechanism utilized by the load balancer 112 to identify the server module 110A-110B that should fulfill a particular client request.

When a request is received from the client computer 104 by one of the router modules 108A-108B, the router module that receives the request will query the load balancer 112 for the network address of the server module 110A-110B to fulfill the client request. Once the router module 108A-108B has the network address of the server module 110A-110B for fulfilling the request, the router module forwards the client request to the appropriate server module 110A-110B. For instance, if the router module 108A is instructed to forward the client request to the server module 110B, the network connection 114B is established with the server module 110B over an appropriate network connection. Similarly, if the router 108B is instructed to forward the client request to the server module 110A, the client request is forwarded via the network connection 114D. Likewise, if the router module 108A is instructed to forward the request to server module 110A, the network connection 114A is established between the router module and the server module 110A for the client request. Similarly, if the router module 108B is instructed to forward the client request to the server module 110B the network connection 114C is established between the router module 108B and the server module 110B and the client request is forwarded thereupon. Responses from the appropriate server module 110A-110B are also returned to the router module 108A-108B via the same network connection.

In the example illustrated in FIG. 1, a network connection 114A is established between the router module 108A and the server module 110A even though these components are executing on the same server computer 102A. Similarly, a network connection 114C is established between the router module 108B and the server module 110B even though these components are executing on the same physical server computer 102B. Establishing the network connections 114A and 114C in this manner is very inefficient. The various concepts and technologies described below with reference to FIGS. 2-4 address this particular routing scenario.

Figure 2:
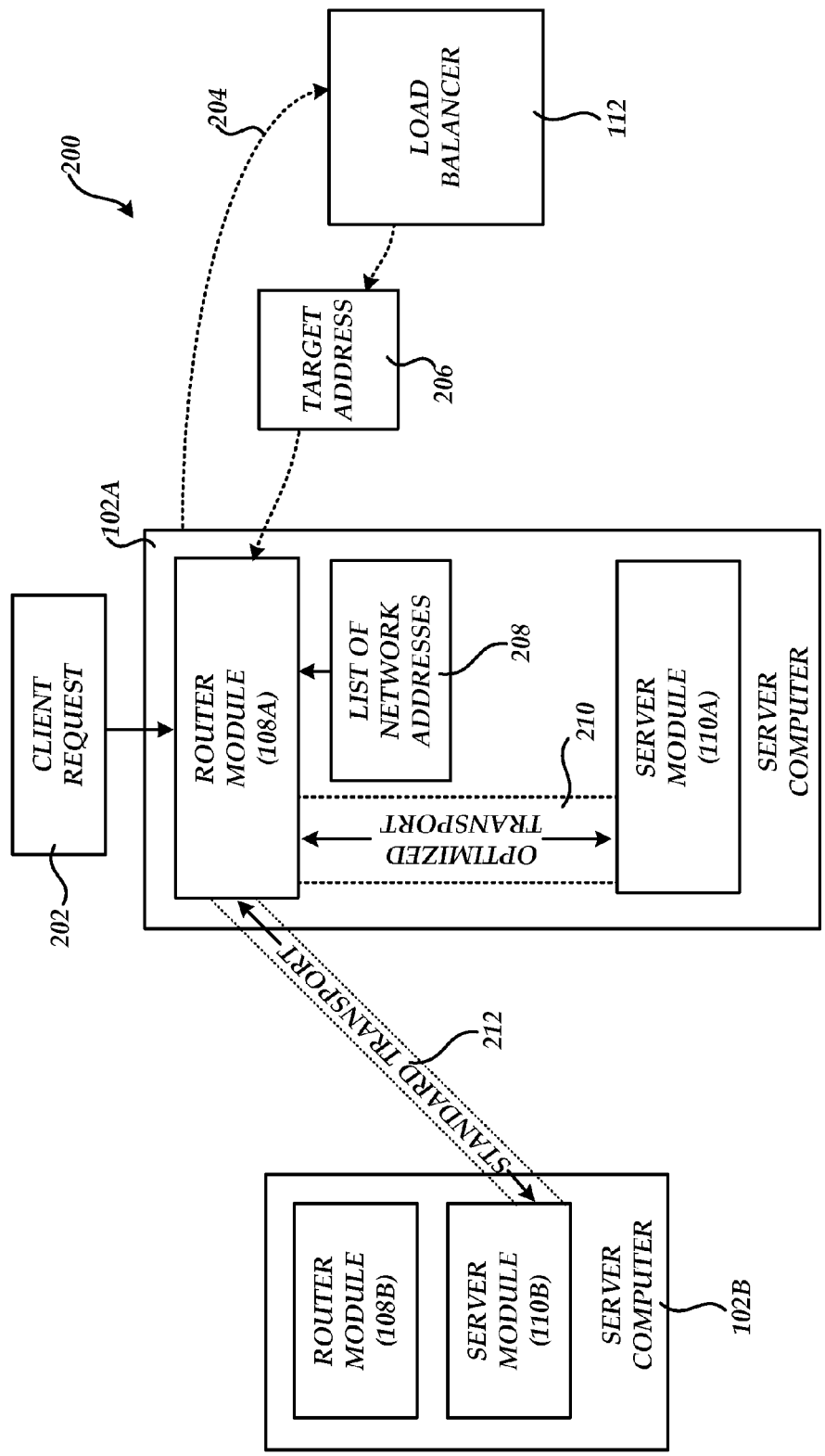
FIG. 2 is a network diagram showing aspects of one embodiment presented herein for optimized routing.

Turning now to FIG. 2, aspects of an illustrative system 200 for providing optimized routing between a router module 108A and a server module 110A will be described. In the system 200 shown in FIG. 2, the router module 108A has been configured for creating an optimized route to the server module 110A when the router module 108A and the server module 110A are executing on the same physical server computer 102A. Additional details regarding this process will be provided below.

As shown in FIG. 2, the router module 108A may receive a client request 202 from the client computer 104. In response to receiving the client request 202, the router module 108A transmits a request 204 to the load balancer 112 for the network address of a server module 110A-110B to fulfill the client request 202. In response to receiving the request 204, the load balancer 112 returns the target address 206 of the server module 110A-110B to fulfill the client request 202.

When the router module 108A receives the target address 206 from the load balancer 112, the router module 108A determines whether the server module that is to fulfill the client request 202 is executing on the same physical computer 102A as the router module 108A. For instance, in one implementation, the router module 108A makes this determination by comparing the target address 206 to a list of network addresses 208 to which the server computer 102A responds. If the target address is identified in the list of network addresses 208, then the router module 108A concludes that the server module 110A is executing on the same physical server computer 102A. If the target address 206 is not contained in the list of network addresses 208, then the router module 108A concludes that the server module to fulfill the client request 202 is executing on another physical computer, such as the server computer 102B.

If the router module 108A concludes that the server module to fulfill the client request 202 is executing on another physical server computer, such as the server module 110B, the router module 108A forwards the client request 202 to the server module 110B over a standard network transport 212. For instance, a TCP/IP transport mechanism may be utilized to forward the client request 202 to the appropriate server module 110B and to return the response to the client request 202 to the router module 108A.

If, however, the router module 108A, determines that the server module to fulfill the client request 202 is executing on the same physical server computer 102A, the router module 108A forwards the client request 202 to the appropriate server module 110A via an optimized transport 210. According to one embodiment, the optimized transport 210 comprises a TCP transport that utilizes binary encoding.

In an alternative embodiment, the optimized transport 210 comprises an optimized local-machine-only transport. The optimized transport 210 is a transport that does not utilize a network stack and therefore is highly optimized compared to other types of transports. For instance, in one embodiment, the optimized local-machine-only transport comprises a WINDOWS COMMUNICATIONS FOUNDATION ("WCF") named pipe binding. A named pipe binding creates an area of shared memory on the server computer 102A through which the router module 108A and the server module 110A can communicate. It should be appreciated that although a WCF named pipe binding is utilized in one particular implementation described herein, other types of inter-process communication mechanisms known to those skilled in the art may be utilized to create a transport between the router module 108A and the server module 110A when these components are executing on the same physical computer. Additional details regarding this process will be provided below with respect to FIGS. 3-4.

Figure 3:
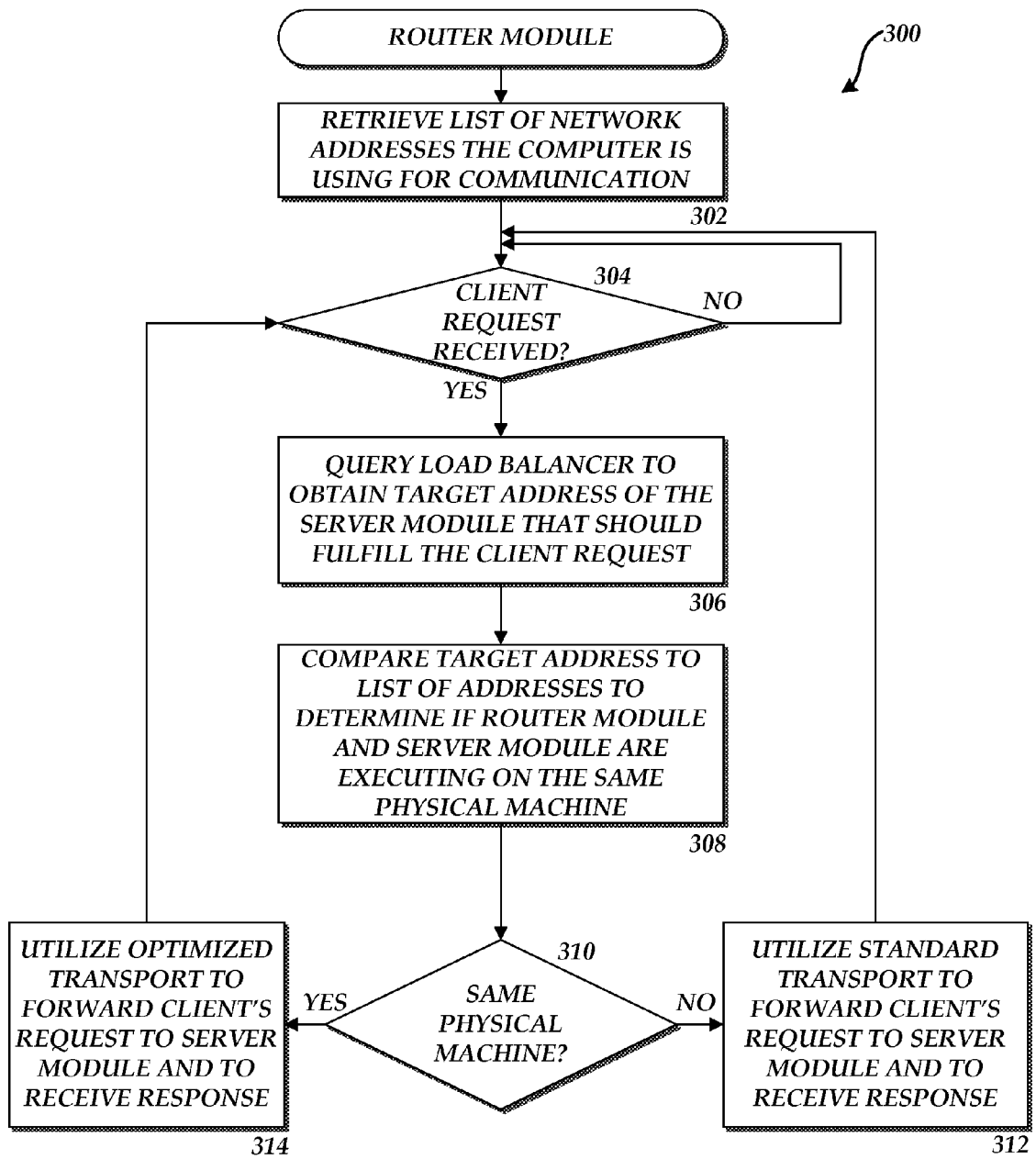
FIG. 3 is a flow diagram showing one illustrative process for optimized routing of a client request in one embodiment presented herein.

Referring now to FIG. 3, additional details will be provided regarding the embodiments presented herein for optimized routing. In particular, FIG. 3 is a flow diagram illustrating aspects of the operation of the router modules 108A-108B according to one embodiment presented herein.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 300 begins at operation 302, where the router module 108A retrieves the list of network addresses 208 that the server computer 102A utilizes for communication. From operation 302, the routine 300 proceeds to operation 304, where the router module 108A determines if a client request 202 has been received from a computer, such as the client computer 104 for instance. If not, the routine 300 returns to operation 304 where another such determination is made. It should be appreciated that although the functionality shown in FIG. 3 is illustrated as being performed in a loop, other embodiments may not utilize a looping mechanism. For instance, in one implementation, the process shown in FIG. 3 may be initiated when a client request is received. As a result, there is no need for the process to loop in the manner shown in FIG. 3 in such an implementation.

If the router module 108A receives a client request 202, the routine 300 proceeds to operation 306. At operation 306, the router module 108A transmits a request 204 to the load balancer 112 to obtain the target address 206 of the server module 110A-110B to fulfill the client request 202. Once the router module 108A has received the target address 206, the router module 108A compares the target address 206 to the network addresses contained in the list of the network addresses 208 to determine if the router module 108A and the server module 110A-110B that will fulfill the client request 202 are executing on the same physical computer system.

If the router module 108 and the server module 110A-110B that will fulfill the client request 202 are not executing on same physical computer, the routine 300 proceeds from operation 310 to operation 312. At operation 312, the router module 108A utilizes a standard network transport 212 to forward the client request 202 to the server module, such as the server module 110B, and to receive the response from the server module 110B in response to the client request 202. From operation 312, the routine 300 proceeds to operation 304, described above, where another such client request may be processed in a similar manner.

If the router module 108A determines that the target address of the server module 110A-110B to fulfill the client request 202 is executing on the same physical server computer, the routine 300 proceeds from operation 310 to operation 314. At operation 314, the router module 108A utilizes an optimized transport 210 to forward the client request 202 to the server module, such as the server module 110A, that will fulfill the client request 202 and to receive the response to the client request 202. As discussed above, the optimized transport 210 may comprise a transport that utilizes binary encoding in one embodiment. For instance, the optimized transport 210 may comprise a TCP transport. Alternatively, the optimized transport 210 may comprise an optimized local-machine-only transport that utilizes binary encoding, such as a named pipe binding. From operation 314, the routine 300 returns to operation 304, discussed above, where another client request 202 may be received and processed in a similar manner.

Figure 4:
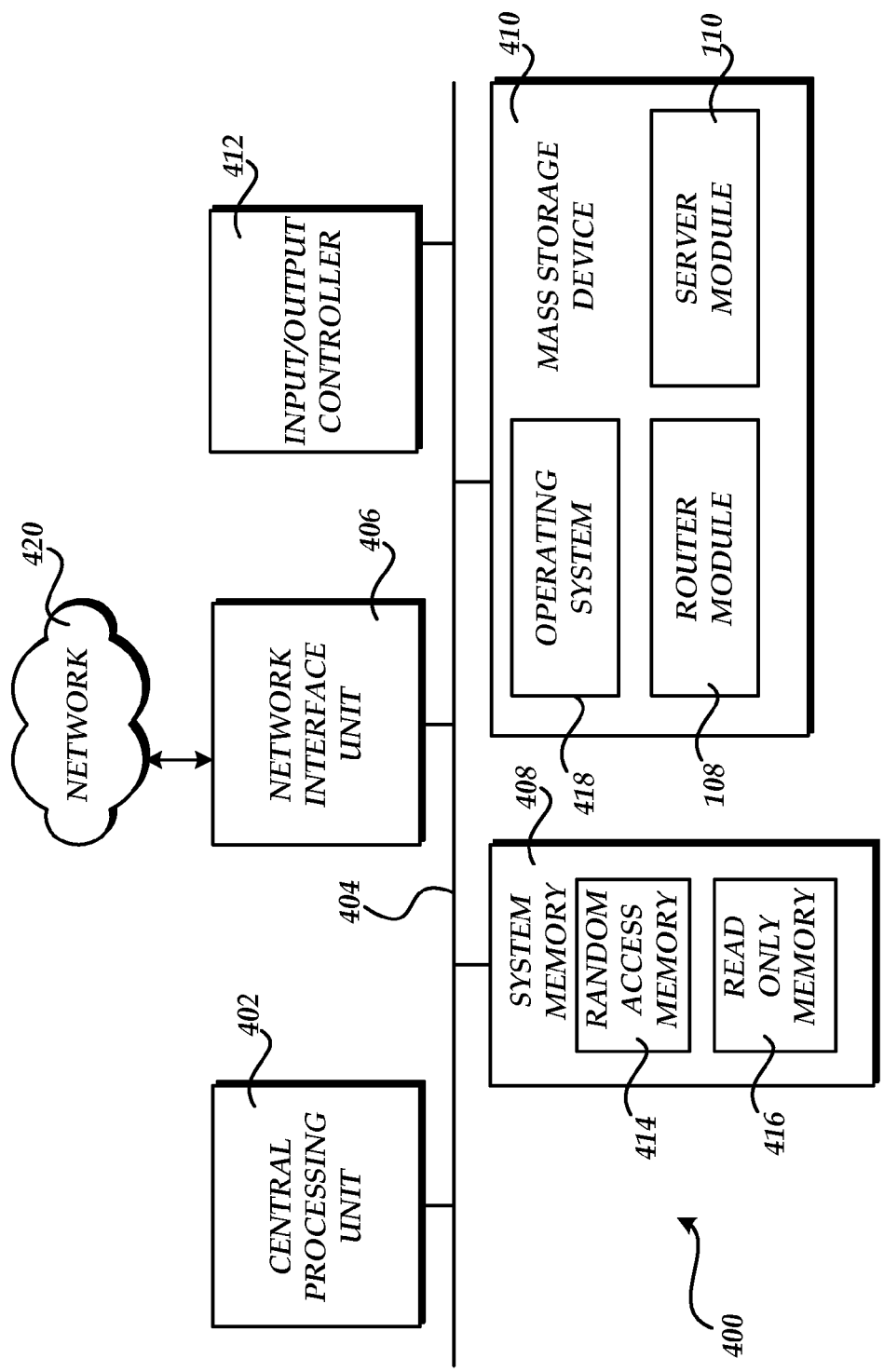
FIG. 4 is a computer architecture diagram showing an illustrative computer hardware and software architecture for a computing system capable of implementing aspects of the embodiments presented herein.

FIG. 4 shows an illustrative computer architecture for a computer 400 capable of executing the software components described herein for optimized routing in the manner presented above. The computer architecture shown in FIG. 4 illustrates a conventional desktop, laptop, or server computer and may be utilized to execute any aspects of the software components presented herein described as executing on the client computer 104, the server computers 102A-102B, and the load balancer 112.

The computer architecture shown in FIG. 4 includes a central processing unit 402 ("CPU"), a system memory 408, including a random access memory 414 ("RAM") and a read-only memory ("ROM") 416, and a system bus 404 that couples the memory to the CPU 402. A basic input/output system containing the basic routines that help to transfer information between elements within the computer 400, such as during startup, is stored in the ROM 416. The computer 400 further includes a mass storage device 410 for storing an operating system 418, application programs, and other program modules, which are described in greater detail herein.

The mass storage device 410 is connected to the CPU 402 through a mass storage controller (not shown) connected to the bus 404. The mass storage device 410 and its associated computer-readable media provide non-volatile storage for the computer 400. Although the description of computer-readable media contained herein refers to a mass storage device, such as a hard disk or CD-ROM drive, it should be appreciated by those skilled in the art that computer-readable media can be any available computer storage media that can be accessed by the computer 400.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 400.

According to various embodiments, the computer 400 may operate in a networked environment using logical connections to remote computers through a network such as the network 420. The computer 400 may connect to the network 420 through a network interface unit 406 connected to the bus 404. It should be appreciated that the network interface unit 406 may also be utilized to connect to other types of networks and remote computer systems. The computer 400 may also include an input/output controller 412 for receiving and processing input from a number of other devices, including a keyboard, mouse, or electronic stylus (not shown in FIG. 4). Similarly, an input/output controller may provide output to a display screen, a printer, or other type of output device (also not shown in FIG. 4).

As mentioned briefly above, a number of program modules and data files may be stored in the mass storage device 410 and RAM 414 of the computer 400, including an operating system 418 suitable for controlling the operation of a networked desktop, laptop, or server computer. The mass storage device 410 and RAM 414 may also store one or more program modules. In particular, the mass storage device 410 and the RAM 414 may store the router module 108 and the server module 110, each of which was described in detail above with respect to FIGS. 1-3. The mass storage device 410 and the RAM 414 may also store other types of program modules and data.

It should be appreciated that the software components described herein may, when loaded into the CPU 402 and executed, transform the CPU 402 and the overall computer 400 from a general-purpose computing system into a special-purpose computing system customized to facilitate the functionality presented herein. The CPU 402 may be constructed from any number of transistors or other discrete circuit elements, which may individually or collectively assume any number of states. More specifically, the CPU 402 may operate as a finite-state machine, in response to executable instructions contained within the software modules disclosed herein. These computer-executable instructions may transform the CPU 402 by specifying how the CPU 402 transitions between states, thereby transforming the transistors or other discrete hardware elements constituting the CPU 402.

Encoding the software modules presented herein may also transform the physical structure of the computer-readable media presented herein. The specific transformation of physical structure may depend on various factors, in different implementations of this description. Examples of such factors may include, but are not limited to: the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software may also transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 400 in order to store and execute the software components presented herein. It also should be appreciated that the computer 400 may comprise other types of computing devices, including hand-held computers, embedded computer systems, personal digital assistants, and other types of computing devices known to those skilled in the art. It is also contemplated that the computer 400 may not include all of the components shown in FIG. 4, may include other components that are not explicitly shown in FIG. 4, or may utilize an architecture completely different than that shown in FIG. 4.

Based on the foregoing, it should be appreciated that technologies for optimized routing are provided herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-readable medium that is not a signal, the computer-readable medium having stored thereon computer-executable instructions comprising: a router module configured to receive a request at a router module, and, in response to receiving the request, to query a load balancer to obtain a network address of a server module to fulfill the request, to determine if the server module is executing on a same computer as the router module by comparing the network address received from the load balancer to a network address in a list of network addresses that a computer executing the router module responds to, to forward the request to the server module utilizing a standard transport in response to determining that the server module is not executing on the same computer as the router module, and to forward the request to the server module utilizing a named pipe binding in response to determining that the server module is executing on the same computer as the router module.

2. The computer-readable medium of claim 1, wherein the named pipe binding comprises a Windows Communications Foundation named pipe binding.

3. The computer-readable medium of claim 1, wherein the named pipe binding utilizes binary encoding.

4. The computer-readable medium of claim 2, wherein the Windows Communications Foundation named pipe binding utilizes binary encoding.

5. A system for routing a client request to a server module, the system comprising a load balancer, a server module configured to receive and respond to the client request, and a computer executing a router module configured to receive the client request and, in response to receiving the client request, to:

query a load balancer to obtain a network address of the server module;

determine if the server module is executing on a same computer as the router module by comparing the network address received from the load balancer to a network address in a list of network addresses that a computer executing the router module responds to;

forward the request to the server module utilizing a standard transport in response to determining that the server module is not executing on the same computer; and forward the request to the server module utilizing a named pipe binding in response to determining that the server module is executing on the same computer.

6. The system of claim 5, wherein the named pipe binding comprises a Windows Communications Foundation named pipe binding.

7. The system of claim 6, wherein the Windows Communications Foundation named pipe binding utilizes binary encoding.

8. The system of claim 5, wherein the named pipe binding utilizes binary encoding.

9. A computer-implemented method for routing a client request to a server module, the computer-implemented method comprising computer-implemented operations for:

receiving a client request at a router module; and in response to receiving the client request, querying a load balancer for a target network address of a server module to fulfill the client request, comparing the target network address to a network address in a list of network addresses to which the router module responds to determine if the router module and the server module are executing on a same computer, forwarding the request to the server module utilizing a standard transport in response to determining that the server module is not executing on the same computer as the router module, and forwarding the client request from the router module to the server module via a named pipe binding, in response to determining that the router module and the server module are executing on the same computer.

10. The computer-implemented method of claim 9, wherein the named pipe binding comprises a Windows Communications Foundation named pipe binding.

11. The computer-implemented method of claim 9, wherein the named pipe binding utilizes binary encoding.

12. The computer-implemented method of claim 10, wherein the Windows Communications Foundation named pipe binding utilizes binary encoding.

* * * * *